United States Patent
Kim et al.

(10) Patent No.: US 8,912,736 B2
(45) Date of Patent: Dec. 16, 2014

(54) DC-DC CONVERTER SYSTEM OF AN ELECTRIC VEHICLE AND CONTROL METHOD THEREOF

(75) Inventors: Sung Kyu Kim, Gyeonggi-so (KR); Wonkyoung Choi, Gyeonggi-do (KR); Mu Shin Kwak, Gyeonggi-do (KR); Suhyun Bae, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 267 days.

(21) Appl. No.: 13/557,575

(22) Filed: Jul. 25, 2012

(65) Prior Publication Data

US 2013/0147404 A1    Jun. 13, 2013

(30) Foreign Application Priority Data

Dec. 7, 2011   (KR) ................. 10-2011-0130511

(51) Int. Cl.
  *H02P 5/00*       (2006.01)
(52) U.S. Cl.
  USPC .............................................. 318/49; 318/51
(58) Field of Classification Search
  USPC ................ 318/139, 49, 51, 55, 59, 66, 71
  See application file for complete search history.

(56) References Cited

U.S. PATENT DOCUMENTS

| | | | | |
|---|---|---|---|---|
| 5,600,215 A | * | 2/1997 | Yamada et al. | 318/139 |
| 5,659,235 A | * | 8/1997 | Yamada et al. | 318/801 |
| 7,486,034 B2 | * | 2/2009 | Nakamura et al. | 318/139 |
| 7,764,051 B2 | * | 7/2010 | Ishikawa et al. | 322/29 |
| 2009/0315392 A1 | * | 12/2009 | Ichikawa et al. | 307/9.1 |
| 2010/0087971 A1 | * | 4/2010 | Yamasaki | 701/19 |
| 2010/0171448 A1 | * | 7/2010 | Kitanaka | 318/45 |
| 2010/0222953 A1 | * | 9/2010 | Tang | 701/22 |
| 2012/0001587 A1 | * | 1/2012 | Kono et al. | 318/801 |

FOREIGN PATENT DOCUMENTS

| | | |
|---|---|---|
| JP | 2007202384 A | 8/2007 |
| JP | 2009-201200 A | 9/2009 |
| KR | 10-0957330 | 12/2007 |
| KR | 10-0951975 | 5/2008 |
| WO | 2007064020 A1 | 6/2007 |

* cited by examiner

*Primary Examiner* — Rina Duda
(74) *Attorney, Agent, or Firm* — Edwards Wildman Palmer LLP; Peter F. Corless

(57) ABSTRACT

Disclosed is a DC/DC converter system that, after calculating required voltages of the first and second motors based on the magnetic flux and speeds of the first and second motors, the voltage supplied to inverters is controlled by a final voltage command determined as a larger value of the battery voltage and the final required voltage. In particular, the final required voltage is determined as a larger value of the required voltages of the first and second motors.

9 Claims, 5 Drawing Sheets

DC-DC CONVERTER SYSTEM OF AN ELECTRIC VEHICLE AND CONTROL METHOD THEREOF

CROSS-REFERENCE TO RELATED APPLICATION

This application claims priority to and the benefit of Korean Patent Application No. 10-2011-0130511 filed in the Korean Intellectual Property Office on Dec. 7, 2011, the entire contents of which are incorporated herein by reference.

BACKGROUND OF THE INVENTION (a) Field of the Invention

The present invention relates to a direct current to direct current (DC-DC) converter system of an electric vehicle and a control method thereof that improves efficiency of the system by controlling an output voltage of the DC-DC converter.

(b) Description of the Related Art

Enhanced fuel consumption has been a growing concern among many individuals along with strengthened exhaust gas regulations. As such, electric vehicles that include at least one electrically driven motor have begun to be manufactured as an alternative to the traditional fuel combustion engine. Such electric vehicles, which are also called an environmentally-friendly vehicles, include fuel cell vehicles, hybrid electric vehicles, plug-in electric vehicles, and pure electric vehicles, which generates driving torque by using electric power system with a high voltage and a large current. Such an electric vehicle typically includes a motor to generate a driving torque, an inverter to control driving of the motor, and a DC-DC converter for transforming the battery voltage of about 350V to 450V and supplying the transformed voltage to the inverter.

Typically, an output voltage of the DC-DC converter is set in accordance with a driving condition in which the inverter operates at its maximum required voltage. That is, such a DC-DC converter always outputs the maximum required voltage of the inverter. However, the voltage required by the drive motor may vary depending on driving conditions, and thus, by setting the output voltage of the DC-DC converter as the maximum required voltage, an unnecessary power loss may be incurred. In this case, unnecessary loss of power stored in the battery voltage may deteriorate the efficiency of the electrical system of the vehicle, resulting in deterioration of fuel efficiency.

FIG. 5 is a graph illustrating power loss at the inverter with respect to the output voltage of the DC-DC converter of a conventional electric vehicle. Referring to FIG. 5, when the voltage output from the DC-DC converter to the inverter becomes larger, the power loss at the inverter also becomes larger. By comparing a first value when the output voltage of the DC-DC converter is set to the maximum required voltage of the inverter with a second value when the output voltage of the DC-DC converter is set to the minimum required voltage, it will be understood that the power loss at the inverter is higher when the DC-DC converter is set to the maximum required voltage of the inverter.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide DC-DC converter system of an electric vehicle having advantages of improved efficiency and enhanced fuel consumption.

An exemplary embodiment of the present invention provides a DC-DC converter system of an electric vehicle that is arranged between a battery acting as a DC power source and first and second motors selectively acting as motor or generator and includes: first and second inverters configured to supply power to the first and second motors or receive power from the first and second motors, respectively. A DC-DC converter boosts DC voltage from the battery and supplies the boosted voltage of the battery to the first and second inverters and boosts DC voltage from first and second inverters and supplies the boosted voltage of the first and second inverters to the battery. A control unit may be configured to control the output voltage supplied to the first and second inverters by switching the DC-DC converters after generating voltage command based on a torque command and a current command map.

The control unit may control the DC-DC converter by: calculating magnetic flux required by the first and second motors according to the torque command; determining output voltage of the DC-DC converter based on the required magnetic flux and speeds of the first and second motors and battery voltage; and generating a voltage command based on the determined output voltage.

The control unit calculates the required voltages of the first and second motors based on the magnetic flux and speed of the first and second motors, determines a final required voltage as a larger value of the required voltages of the first and second motors, and determines a final voltage command as a larger value of the battery voltage and the final required voltage.

The control unit may include: a converter controller configured to control switching of the DC-DC converter by generating a pulse width modulation (PWM) signal according to the torque command; and a motor controller configured to control switching of the first and second inverters by generating the PWM signal according to the torque command.

The converter controller may include: a magnetic flux calculator configured to calculate a magnetic flux of the first and second motors based on the torque command and temperatures of the first and second motors; and a voltage command generator configured to generate the final voltage command for controlling the DC-DC converter based on required magnetic flux and speed of the first and second motors and the battery voltage.

The voltage command generator may include: a first calculator configured to generate a first voltage command based on the magnetic flux and speed of the first motor; a second calculator configured to generate a second voltage command based on the magnetic flux and speed of the second motor; and a third calculator configured to generate a final voltage command based on the battery voltage and the first and second voltage commands respectively generated by the first and second calculators.

Another exemplary embodiment of the present invention provides a control method of a DC-DC converter of an electric vehicle, including: measuring a torque command to request driving of first and second motors, rotational speeds of the first and second motors, magnetic flux of the first and second motors, and a battery voltage; calculating required voltages of the first and second motors based on the magnetic flux and speeds of the first and second motors; determining a final required voltage as a larger value of the required voltages of the first and second motors; and determining a final voltage command as a larger value of the battery voltage and the final required voltage.

According to an exemplary embodiment of the present invention, output voltage of a DC-DC converter of an electric vehicle is controlled depending on battery voltage and driving conditions of motors and inverters, and accordingly, unnecessary power loss of inverters may be minimized while improving efficiency and enhancing fuel consumption.

DESCRIPTION OF SYMBOLS

Figure 1:
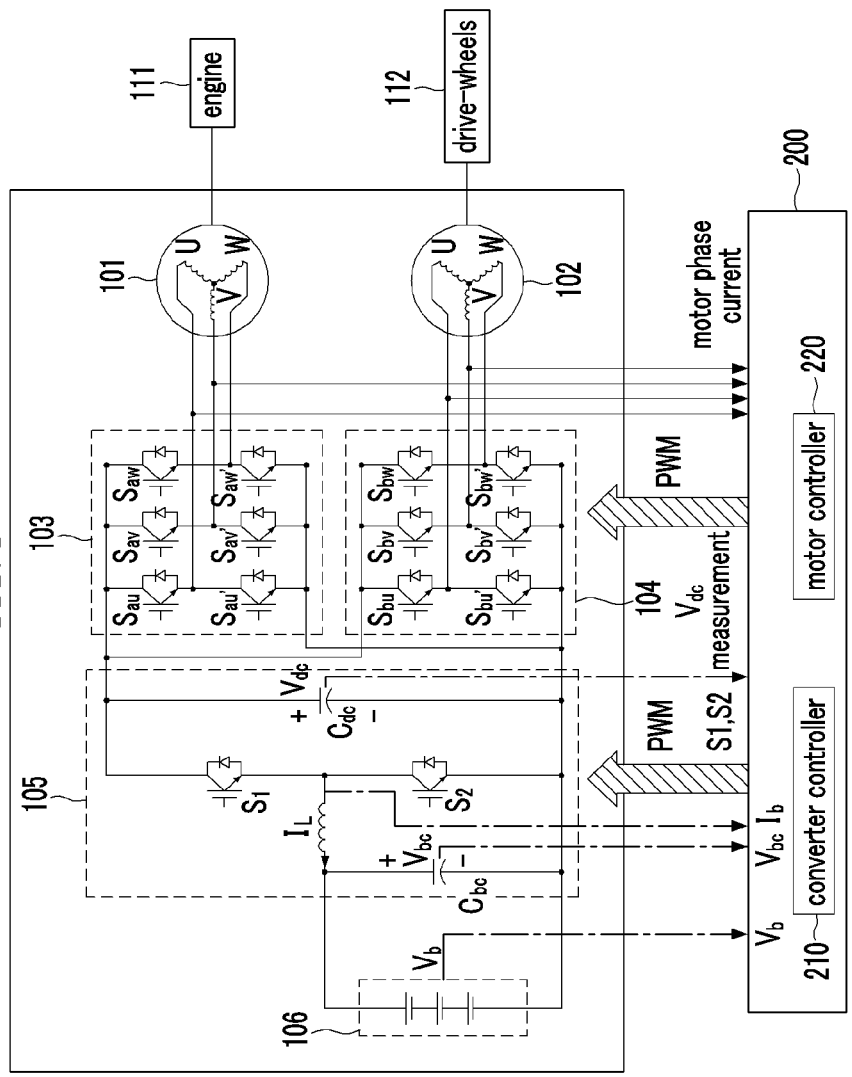
FIG. 1 illustrates a DC-DC converter system of an electric vehicle according to an exemplary embodiment of the present invention.

101: the first motor
102: the second motor
103: the first inverter
104: the second inverter
105: DC-DC converter
106: battery
200: control unit
210: converter controller
220: motor controller
211: magnetic flux calculator
212: voltage command generator

DETAILED DESCRIPTION OF THE EMBODIMENTS

Hereinafter, referring to the drawings, an exemplary embodiment of the present invention is described in detail with reference to drawings. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification. The configurations shown in the drawings are arbitrarily given for convenience of the description, and the present invention is not necessarily limited to the drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum) which include one or more electric motors. As referred to herein, a hybrid vehicle is a vehicle that has two or more sources of power, for example both gasoline-powered and electric-powered vehicles.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a server or a network. Additionally, although the exemplary embodiment is described as using one control unit to perform the above process, it is understood that the above processes may also be performed by a plurality of control units, controllers, processors or the like.

FIG. 1 illustrates a DC-DC converter system of an electric vehicle according to an exemplary embodiment of the present invention. Referring to FIG. 1, a DC-DC converter system of an electric vehicle according to an exemplary embodiment of the present invention includes a first motor 101, a second motor 102, a first inverter 103, a second inverter 104, a DC-DC converter 105, a battery 106, and a control unit 200. The first motor 101 may be a three-phase alternating current (AC) motor. The first motor 101 may operate as a motor to start an engine 111 and also operate as a generator when the engine 111 is running after being started.

In order to start the engine 111, the first motor 101 is driven by a three-phase AC voltage supplied from the first inverter 103. When the engine 111 is running, the first motor 101 generates a three-phase AC voltage and outputs the generated voltage to the first inverter 103.

The second motor 102 is a three-phase AC motor that drives a drive-wheel 112, and generates a drive-torque by a three-phase AC voltage supplied from the second inverter 104. The second motor 102 also acts as a generator during a regenerative braking of the electric vehicle. In this case, the second motor 102 generates a three-phase AC voltage and outputs the generated voltage to the second inverter 104.

The first motor 101 may include Y connection three-phase coils as stator coils. Ends of the three-phase coils of U-phase, V-phase, and W-phase coils are interconnected to form a neutral point, and other ends of the U-phase, V-phase, and W-phase coils are connected with corresponding arms of the first inverter 103.

The second motor 102 includes Y connection three-phase coils as stator coils. Ends of the three-phase coils of U-phase, V-phase, and W-phase coils are interconnected to form a neutral point, and other ends of the U-phase, V-phase, and W-phase coils are connected with corresponding arms of the second inverter 104.

The first inverter 103 transforms, in response to a pulse width modulation (PWM) signal applied by the control unit 200, the DC voltage of the battery 106 boosted at and supplied from the DC-DC converter 105 to the three-phase AC voltage, and then supplies the transformed voltage to the first motor 101 as a driving voltage.

The second inverter 104 transforms, in response to pulse width modulation (PWM) signal applied by the control unit 200, the DC voltage of the battery 106 boosted at and supplied from the DC-DC converter 105 to the three-phase AC voltage, and then supplies the transformed voltage to the second motor 102 as a driving voltage.

The first inverter 103 includes power switching elements coupled in series, i.e., U-phase arms $S_{au}$ and $S_{au'}$, V-phase arms $S_{av}$ and $S_{av'}$, and W-phase arms $S_{aw}$ and $S_{aw'}$. The power switching elements of the first inverter 103 may be an NPN transistor, insulated gate bipolar transistor (IGBT), or metal-oxide-semiconductor field-effect transistor (MOSFET).

The second inverter 104 includes power switching elements coupled in series, i.e., U-phase arms $S_{bu}$ and $S_{bu'}$, V-phase arms $S_{bv}$ and $S_{bv'}$, and W-phase arms $S_{bw}$ and $S_{bw'}$. The power switching elements of the second inverter 104 may be an NPN transistor, insulated gate bipolar transistor (IGBT), or metal-oxide-semiconductor field-effect transistor (MOSFET).

The DC/DC converter 105 is arranged between the battery 106 and the first and second inverters 103 and 104. According to the PWM duty control signal applied by the control unit 200, the DC/DC converter 105 boosts the DC voltage supplied from the battery 106 to a predetermined voltage level and outputs the boosted voltage to the first and second inverters 103 and 104. In addition, according to the PWM duty control signal applied by the control unit 200, the DC-DC converter 105 boosts the DC voltage supplied from the first inverter 103 or the second inverter 104 and supplies the boosted voltage to the battery 106 as a charging voltage.

The DC-DC converter 105 may be connected with both ends of the battery 106 through, e.g., a main relay (not shown). The DC-DC converter 105 may include first and second power switching elements $S_1$ and $S_2$, and a smoothing capacitor $C_{bc}$. The first and second power switching elements $S_1$ and $S_2$ are coupled in series with a DC link capacitor $C_{dc}$, and the smoothing capacitor $C_{bc}$ "softens" the voltage fluctuation of the battery 106.

The battery 106 storing DC power source is preferably a high voltage battery formed with a plurality of unit cells. The battery 106 may be formed as, e.g., nickel-hydrogen, lithium-ion rechargeable battery, and/or large capacity capacitor. The DC voltage stored in the battery 106 may preferably be boosted by the DC-DC converter 105 and supplied to the first motor 101 or the second motor 102.

According to a torque command applied by an upstream controller, the control unit 200 generates a PWM signal for switching the DC-DC converter 105 based on a predetermined current command map data, and thus switches the first and second power switching elements $S_1$ and $S_2$. Accordingly, the voltage supplied from the battery 106 is boosted to a predetermined level, and the boosted voltage is supplied to the first and second inverters 103 and 104, after being temporarily stored in the DC link capacitor $C_{dc}$.

In addition, according to a torque command applied by an upstream controller, the control unit 200 generates a PWM signal for controlling switching of the first and second inverters 103 and 104 in order to convert the voltage from the DC-DC converter 105 to a three-phase AC voltage and to drive the first motor 101 or the second motor 102.

While controlling switching of the DC-DC converter 105 and the first and second inverters 103 and 104, the control unit 200 measures information regarding output voltage $V_b$ and output current $I_b$ of the battery 106, voltage $V_{dc}$, charged at the DC link capacitor $C_{dc}$ of the DC-DC converter 105, drive currents applied respective phases of the first and second motors 101 and 102, and temperature of the first and second motors 101 and 102, and modulates the PWM signal for switching the DC-DC converter 105 and the PWM signal for switching the first and second inverters 103 and 104.

When a torque command is received from an upstream controller, the control unit 200 calculates magnetic flux required by the first and second motors 101 and 102 based on a predetermined current command map data, and determines an output voltage of the DC-DC converter 105 based on the magnetic flux and speed required by the first and second motors 101 and 102, and the battery voltage $V_b$. Since the control unit 200 generates a PWM signal according to the output voltage of the DC-DC converter 105 and switches the first and second power switching elements $S_1$ and $S_2$ of the DC-DC converter 105, power loss of the first and second inverters 103 and 104 may be minimized and the voltage output may have an optimal efficiency.

As described above, the control unit 200 may determine the voltage required by the first and second inverters 103 and 104 from the magnetic flux and speed required by the first and second motors 101 and 102. The control unit 200 may include a converter controller 210 and a motor controller 220. The converter controller 210 may be configured to generate a PWM signal according to a torque command applied by an upstream controller, and control switching of the DC-DC converter 105 by the PWM signal. The motor controller 220 may be configured to generate a PWM signal according to a torque command applied by an upstream controller, and control switching of the first and second inverters 103 and 104.

Figure 2:
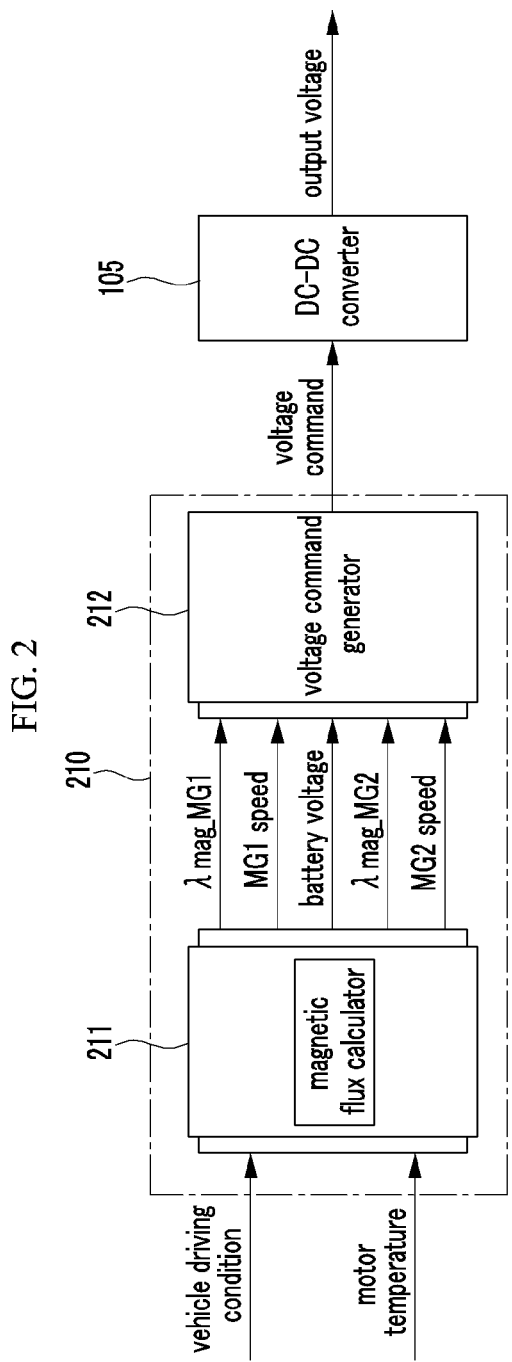
FIG. 2 illustrates in detail a converter controller shown in FIG. 1.

As shown in FIG. 2, the converter controller 210 includes a magnetic flux calculator 211 and a voltage command generator 212. The magnetic flux calculator 211 calculates magnetic flux $\lambda_{mag\_MG1}$ and $\lambda_{mag\_MG2}$ of the first and second motors 101 and 102, based on torque command, which is a driving condition of a vehicle, and temperatures of the first and second motors 101 by using a predetermined current command map data.

The voltage command generator 212 may generate a first voltage command based on magnetic flux $\lambda_{mag\_MG1}$ and speed of the first motor 101 supplied by the magnetic flux calculator 211 and a second voltage command based on magnetic flux $\lambda_{mag\_MG2}$ and speed of the second motor 101 supplied by the magnetic flux calculator 211. Then, the voltage command generator 212 generates a PWM signal by determining a final voltage command for switching the DC-DC converter 105 based on the first voltage command, the second voltage command, and the voltage of the battery 106.

Figure 3:
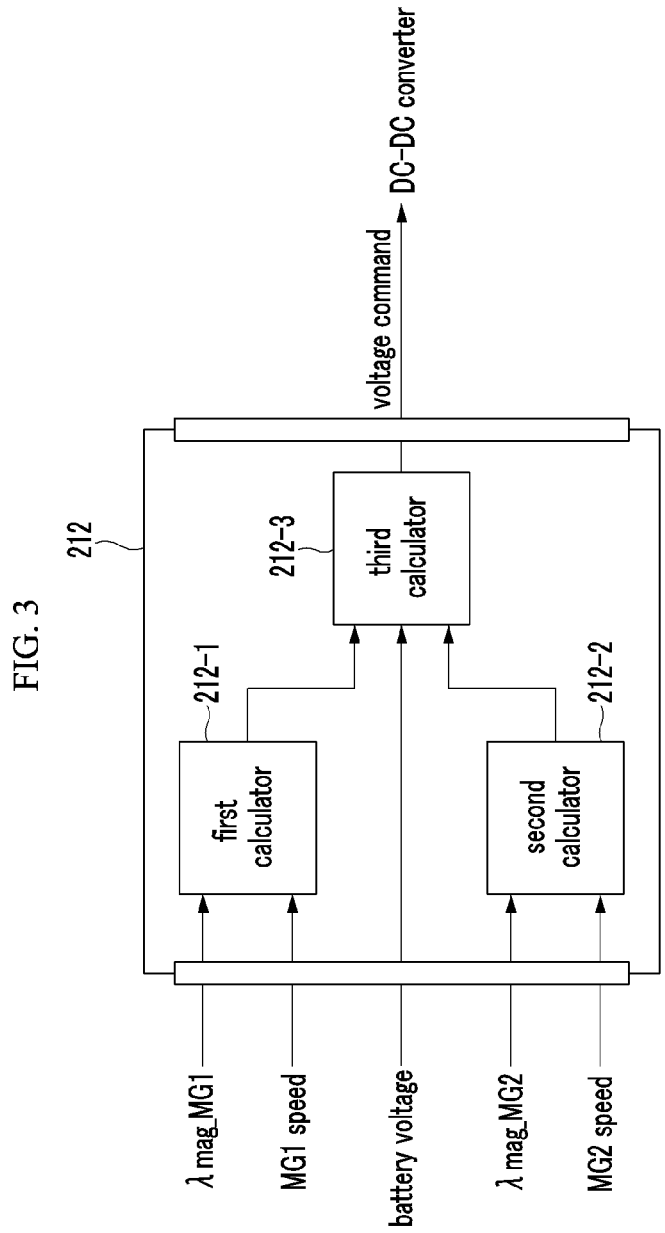
FIG. 3 illustrates in detail a voltage command generator shown in FIG. 2.

As shown in FIG. 3, the voltage command generator 212 includes a first calculator 212-1, a second calculator 212-2, and a third calculator 212-3. The first calculator 212-1 generates the first voltage command based on magnetic flux $\lambda_{mag\_MG1}$ and speed of the first motor 101. The second calculator 212-1 generates the second voltage command based on magnetic flux $\lambda_{mag\_MG2}$ and speed of the second motor 102. The third calculator 212-3 generates the final voltage command for controlling switching of the DC-DC converter 105, based on the voltage of the battery and the first and second voltage commands generated respectively at the first and second calculators 212-1 and 212-2. An operation of a DC-DC converter system according to an exemplary embodiment of the present invention is hereinafter described in detail.

Figure 4:
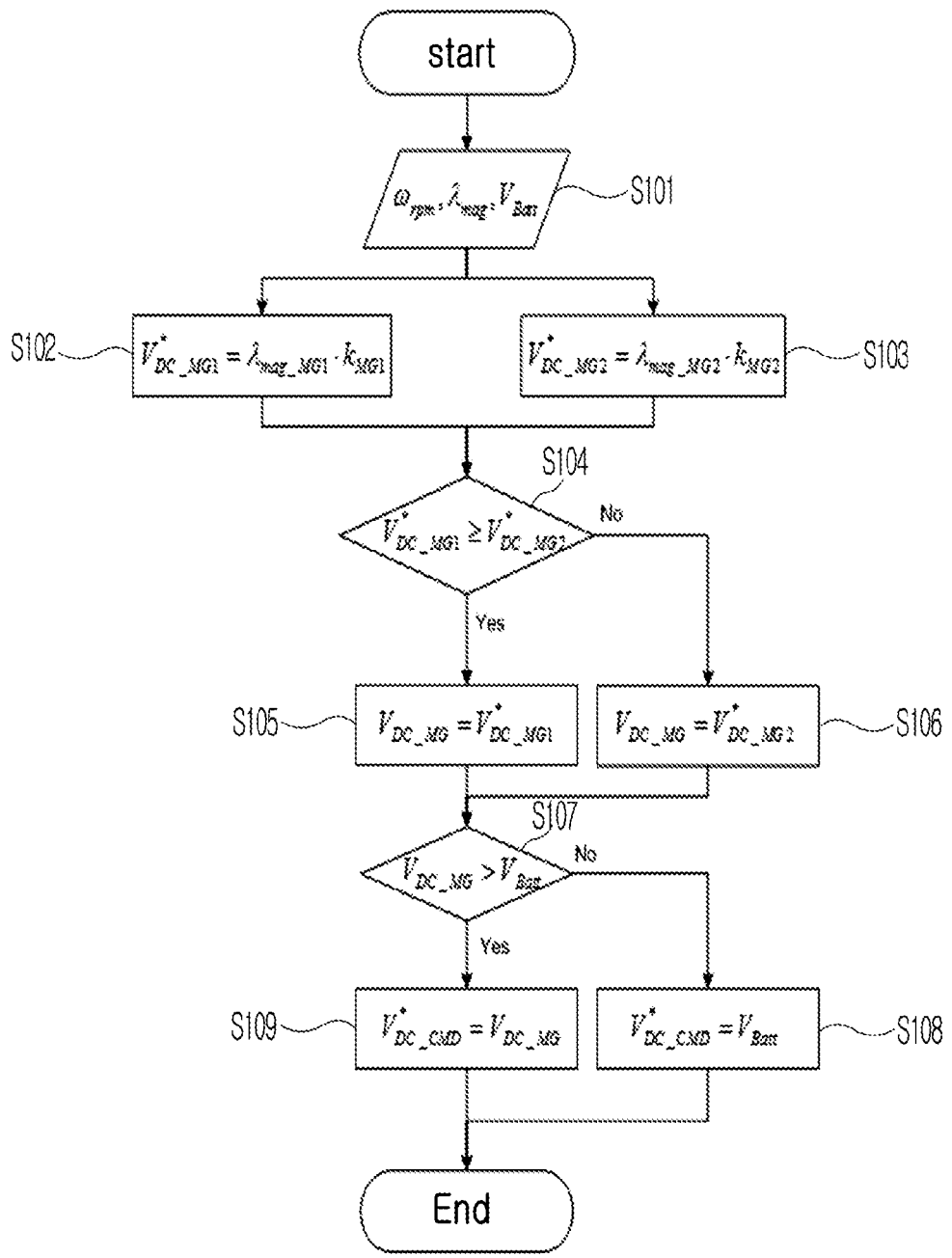
FIG. 4 is a flowchart illustrating a control method of a DC-DC converter of an electric vehicle according to an exemplary embodiment of the present invention.
Figure 5:
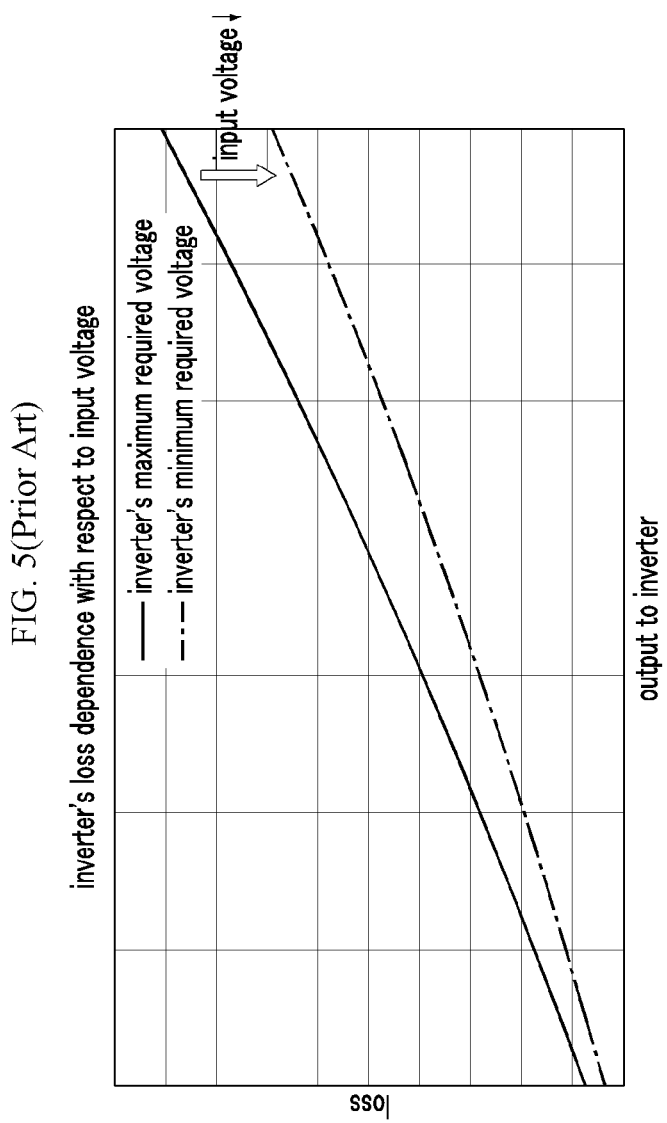
FIG. 5 is a graph illustrating power loss at the inverter with respect to the output voltage of the DC-DC converter of a conventional electric vehicle.

FIG. 4 is a flowchart illustrating a control method of a DC-DC converter of an electric vehicle according to an exemplary embodiment of the present invention. Referring to FIG. 4, when an electric vehicle is running, in step S101, the control unit 200 measures rotational speed $\omega_{rpm\_MG1}$ and magnetic flux $\lambda_{mag\_MG1}$ of the first motor 101, rotational speed $\omega_{rpm\_MG2}$ and magnetic flux $\lambda_{mag\_MG2}$ of the second motor 102, and the voltage $V_{Batt}$ of the battery 106 S101.

Then at step S102, the control unit 200 calculates a required voltage $V^*_{DC\_MG1}$ of the first motor 101 based on the magnetic flux $\lambda_{mag\_MG1}$ and a normalized speed $k_{MG1}$ of the first motor 101. The normalized speed $k_{MG1}$ of the first motor 101 may be easily obtained by a person of an ordinary skill in the art based on the rotational speed $\omega_{rpm\_MG1}$ of the first motor 101, for example, by multiplying a proportional coefficient to the rotational speed.

And at step S103, the control unit 200 calculates a required voltage $V^*_{DC\_MG2}$ of the second motor 102 based on the magnetic flux $\lambda_{mag\_MG2}$ and a normalized speed $k_{MG2}$ of the second motor 102. The normalized speed $k_{MG2}$ of the second motor 102 may be easily obtained by a person of an ordinary skill in the art based on the rotational speed $\omega_{rpm\_MG2}$ of the second motor 102, for example, by multiplying a proportional coefficient to the rotational speed.

When the required voltage $V^*_{DC\_MG1}$ of the first motor 101 and the required voltage $V^*_{DC\_MG2}$ of the second motor 102 are calculated at the S102 and S103, the control unit 212 determines whether the required voltage $V^*_{DC\_MG1}$ of the first motor 101 is greater than the required voltage $V^*_{DC\_MG2}$ of the second motor 102 at step S104. When the required voltage $V^*_{DC\_MG1}$ of the first motor 101 is greater than the required voltage $V^*_{DC\_MG2}$ of the second motor 102, the control unit 200 determines, at step S105, the final required voltage $V_{DC\_MG}$ as the required voltage $V^*_{DC\_MG1}$ of the first motor 101.

When the required voltage $V^*_{DC\_MG2}$ of the second motor 102 is greater than the required voltage $V^*_{DC\_MG1}$ of the first motor 101, the control unit 200 determines, at step S106, the final required voltage $V_{DC\_MG}$ as the required voltage $V^*_{DC\_MG2}$ of the second motor 102. That is, through the steps S104, S105, and S106, the final required voltage $V_{DC\_MG}$ is determined as a larger value of the required voltages $V^*_{DC\_MG1}$ and $V^*_{DC\_MG2}$ of the first and second motors 101 and 102. Then at step S107, the control unit 200 determines whether such determined final required voltage $V_{DC\_MG}$ is greater than the voltage $V_{Batt}$ of the battery 106.

When the voltage $V_{Batt}$ of the battery 106 is greater than the final required voltage $V_{DC\_MG}$, the control unit 200 determines, at step S108, the final voltage command $V^*_{DC\_CMD}$ for controlling switching of the DC-DC converter 105 as the voltage $V_{Batt}$ of the battery 106. When the final required voltage $V_{DC\_MG}$ is greater than the voltage $V_{Batt}$ of the battery 106, the control unit 200 determines, at step S109, the final voltage command $V^*_{DC\_CMD}$ for controlling switching of the DC-DC converter 105 as the final required voltage $V_{DC\_MG}$. That is, through the steps S107, S108, and S109, the final voltage command $V^*_{DC\_CMD}$ for controlling switching of the DC-DC converter 105 is determined as a larger value of the final required voltage $V_{DC\_MG}$ and the voltage $V_{Batt}$ of the battery 106.

Then, the control unit 210 generates a PWM signal for outputting such determined final voltage command $V^*_{DC\_CMD}$ and operates the first and second power switching elements $S_1$ and $S_2$ of the DC-DC converter 105 in order to boost the voltage supplied by the battery 106, whereby the boosted voltage is supplied to the first and second inverters 103 and 104. Therefore, since the voltage supplied to the first and second inverters 103 and 104 follows actual characteristic of inverters and motors and actual battery voltage characteristic, voltage loss is minimized while efficiency is improved and fuel consumption is enhanced. While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A DC-DC converter system of an electric vehicle, the DC-DC converter system being arranged between a battery acting as a DC power source and first and second motors selectively acting as a motor or a generator respectively, the DC-DC converter system comprising:
   first and second inverters configured to supply power to the first and second motors or receive power from the first and second motors, respectively;
   a DC-DC converter configured to boost DC voltage from the battery and supply the boosted voltage of the battery to the first and second inverters and boost DC voltage from the first and second inverters and supply the boosted voltage of the first and second inverters to the battery; and
   a control unit configured to control an output voltage supplied to the first and second inverters by switching the DC-DC converters after generating a voltage command,
   wherein the control unit controls the DC-DC converter by:
     calculating magnetic flux required by the first and second motors according to the torque command;
     determining the output voltage of the DC-DC converter based on the required magnetic flux and speeds of the first and second motors and battery voltage; and
     generating the voltage command based on the determined output voltage.

2. The DC-DC converter system of claim 1, wherein the control unit is configured to:
   calculate the required voltages of the first and second motors based on the magnetic flux and speed of the first and second motors,
   determine a final required voltage as a larger value of the required voltages of the first and second motors, and
   determine a final voltage command as a larger value of the battery voltage and the final required voltage.

3. The DC-DC converter system of claim 1, wherein the voltage command is based on a torque command and a current command map.

4. A DC-DC converter system of an electric vehicle, the DC-DC converter system being arranged between a battery acting as a DC power source and first and second motors selectively acting as a motor or a generator respectively, the DC-DC converter system comprising:
   first and second inverters configured to supply power to the first and second motors or receive power from the first and second motors, respectively;
   a DC-DC converter configured to boost DC voltage from the battery and supply the boosted voltage of the battery to the first and second inverters and boost DC voltage from the first and second inverters and supply the boosted voltage of the first and second inverters to the battery;
   a control unit configured to control an output voltage supplied to the first and second inverters by switching the DC-DC converters after generating a voltage command;
   a magnetic flux calculator configured to calculate magnetic flux of the first and second motors based on the torque command and temperatures of the first and second motors; and
   a voltage command generator configured to generate the final voltage command to control the DC-DC converter based on required magnetic flux and speeds of the first and second motors and the battery voltage.

5. The DC-DC converter system of claim 4, wherein the voltage command is based on a torque command and a current command map.

6. A DC-DC converter system of an electric vehicle, the DC-DC converter system being arranged between a battery acting as a DC power source and first and second motors selectively acting as a motor or a generator respectively, the DC-DC converter system comprising:
   first and second inverters configured to supply power to the first and second motors or receive power from the first and second motors, respectively;
   a DC-DC converter configured to boost DC voltage from the battery and supply the boosted voltage of the battery to the first and second inverters and boost DC voltage from the first and second inverters and supply the boosted voltage of the first and second inverters to the battery;

a control unit configured to control an output voltage supplied to the first and second inverters by switching the DC-DC converters after generating a voltage command;

a first calculator configured to generate a first voltage command based on a magnetic flux and speed of the first motor;

a second calculator configured to generate a second voltage command based on the magnetic flux and speed of the second motor; and a third calculator configured to generate a final voltage command based on the battery voltage and the first and second voltage commands respectively generated by the first and second calculators.

7. The DC-DC converter system of claim 6, wherein the voltage command is based on a torque command and a current command map.

8. A control method of a DC-DC converter of an electric vehicle, comprising:

measuring, by a control unit, a torque command to request driving of first and second motors, rotational speeds of the first and second motors, magnetic flux of the first and second motors, and a battery voltage;

calculating, by the control unit, required voltages of the first and second motors based on the magnetic flux and speeds of the first and second motors respectively;

determining, by the control unit, a final required voltage as a larger value of the required voltages of the first and second motors; and determining, by the control unit, a final voltage command as a larger value of the battery voltage and the final required voltage.

9. A non-transitory computer readable medium containing program instructions executed by a processor or controller, the computer readable medium comprising:

program instructions that measure a torque command to request driving of first and second motors, rotational speeds of the first and second motors, magnetic flux of the first and second motors, and a battery voltage;

program instructions that calculate required voltages of the first and second motors based on the magnetic flux and speeds of the first and second motors respectively;

program instructions that determine a final required voltage as a larger value of the required voltages of the first and second motors; and program instructions that determine a final voltage command as a larger value of the battery voltage and the final required voltage.

* * * * *